March 8, 1960 K. E. LITTLEFIELD ET AL 2,928,047

BROAD RANGE PHASE DISCRIMINATOR

Filed Sept. 30, 1957 2 Sheets-Sheet 1

INVENTOR.
K. E. Littlefield
J. L. Myers

BY [signature]
ATTORNEY

March 8, 1960 K. E. LITTLEFIELD ET AL 2,928,047

BROAD RANGE PHASE DISCRIMINATOR

Filed Sept. 30, 1957 2 Sheets-Sheet 2

INVENTOR.
K. E. Littlefield
BY J. L. Myers

ATTORNEY 2,928,047
Patented Mar. 8, 1960

2,928,047

BROAD RANGE PHASE DISCRIMINATOR

Kenneth E. Littlefield, Canoga Park, and John L. Myers, Burbank, Calif., assignors to Bendix Aviation Corporation, North Hollywood, Calif., a corporation of Delaware Application September 30, 1957, Serial No. 687,265

8 Claims. (Cl. 324—83)

This invention relates to phase detectors and discriminators for indicating or controlling apparatus in accordance with phase changes between two alternating potentials of the same frequency.

An object of the invention is to provide a practicable electronic system capable of producing non-ambiguous responses to phase angle variations exceeding ±90°.

Other more specific objects and features of the invention will appear from the description to follow.

All previous electronic systems known to us for responding to phase differences between two alternating potentials are capable of producing non-ambiguous results only for phase differences not exceeding ±90° (or a total range of 180°), for the reason that the output potential reverses its direction of change every 180°. This means that with a conventional phase discriminator, the output potentials produced by a phase variation from 0° to 180° are identical with those produced by a phase variation from 360° to 180°.

In accordance with the present invention, the outputs from two ±90° phase discriminators are treated and combined in such a way that the resultant output potential varies continuously in the same direction over a range exceeding ±90° and approaching ±180° as a theoretical limit. Apparatus for accomplishing this and its mode of operation will be described in connection with the drawing, in which.

The basic principle of the invention will be explained with reference to Fig. 2, in which: curve E shows an ideal transfer characteristic that can be obtained with apparatus including a known ±90° phase discriminator; curve G shows an ideal transfer characteristic which can be approximated with apparatus in accordance with the invention; curve H shows the characteristic resulting from summation of waves E and G; and curve I shows an inversion of wave H. In each curve, the ordinate shows the amplitude and polarity of a potential obtained in response to the phase angle (positive or negative) represented by the corresponding abscissa.

It will be observed that in curve E the potential varies linearly from zero at 0° phase angle to maximum positive and negative values at −90° and +90°, respectively, then reverses, and returns to zero at −180° and +180°. This curve is ambiguous beyond ±90°.

Curve G has a portion varying from zero to a positive amplitude double that of curve E during a phase change from −90° to −180° and a portion varying from zero to a negative amplitude double that of curve E during a phase change from +90° to +180°.

Obviously, if the potentials of curve G are added to the potentials of curve E, the sum result is curve H, in which the potential decreases continuously from a positive value to a negative value in response to a phase excursion from −180° to +180°.

Inversion of curve H obviously produces curve I, in which the potential increases continuously from a negative value to a positive value in response to a phase change from −180° to +180°.

In its broadest aspects, the present invention resides in the concept of adding to the characteristic shown in curve E the characteristic shown in curve G to produce a characteristic varying continuously in one direction from −180° to +180°, as shown in curves H and I.

Figures 1, 2, 3, 4, 5:
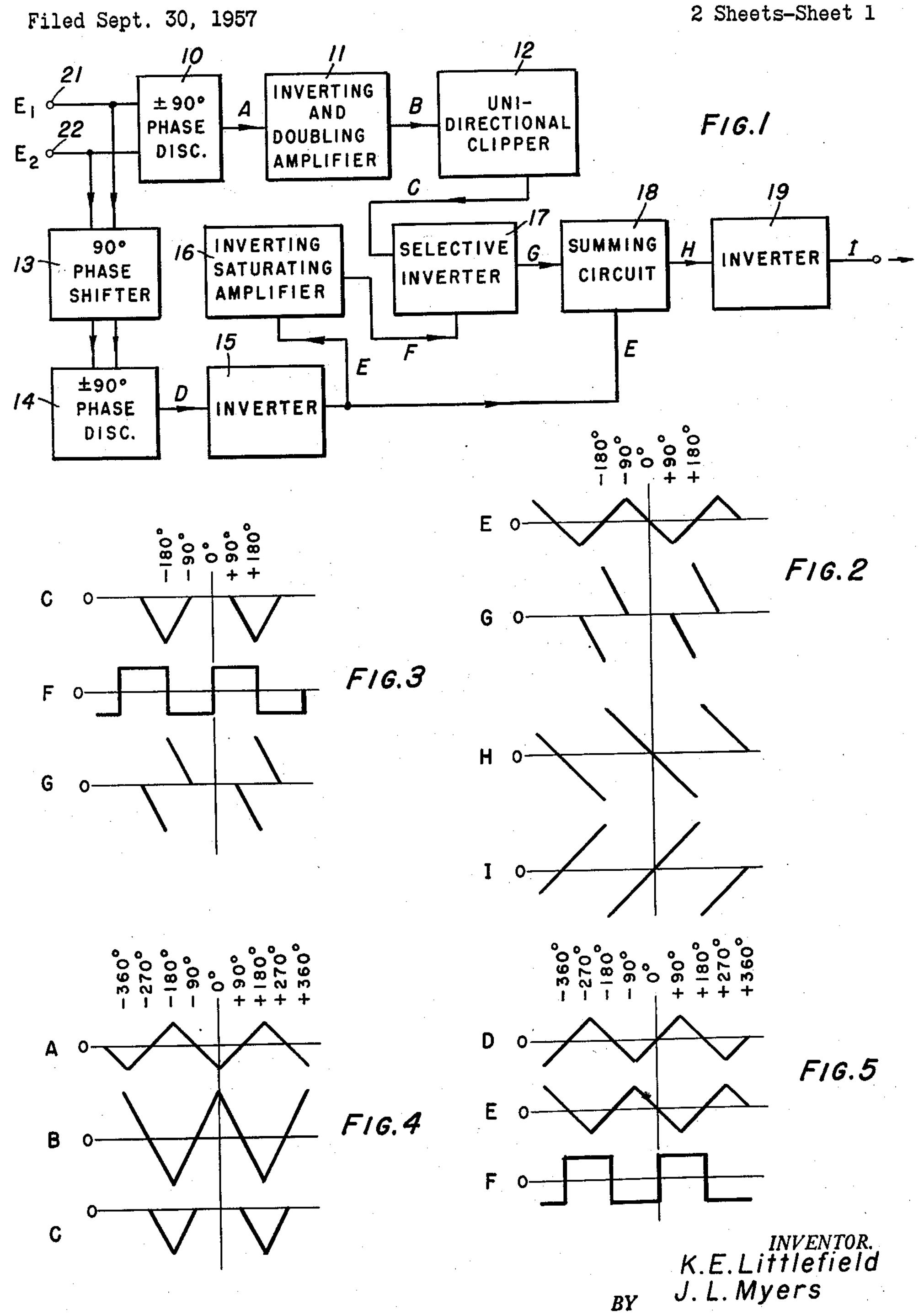
Fig. 1 is a block diagram of a circuit incorporating the invention.
Figs. 2 to 5 are graphs explaining the operation of the circuit of Fig. 1.

Fig. 3 shows how the curve G of Fig. 2 can be obtained from V-shaped curves, as shown in curve C, by selectively inverting portions thereof in response to a control potential of one polarity while passing other portions without inversion in response to a control potential of opposite polarity. A suitable control potential has the characteristic of curve F. As will be explained in detail later, the curve C is passed without inversion during positive portions of the curve F and is inverted during the negative portions of curve F. In curve C it will be observed that the first half of each V in Fig. 3 is reproduced without inversion, whereas the last half of each V is inverted; i.e., reversed in polarity.

Referring to Fig. 4, the curve C of Fig. 3 can be produced from the output of a known ±90° discriminator, as shown in curve A, by amplifying and inverting it to produce the curve B, and clipping the positive portions.

Referring to Fig. 5, the control potential F of Fig. 3 can be produced from the curve E by inverting it and converting it to a square transfer characteristic. As will appear later, both operations can be performed in a single high-gain saturating amplifier. Curve E can be derived from curve D by inverting the latter. Curve D is identical with curve A of Fig. 4, except that it is phase-retarded 90°. In practice, a known type of discriminator may be used to obtain curve A, and curve D can be obtained with the same type of discriminator by first introducing a fixed 90° phase lag between the input potentials.

Referring now to Fig. 1, two alternating input voltages $E_1$ and $E_2$ (of the same frequency and amplitude) to be compared as to phase are applied to the input terminals 21 and 22, and thence applied to a ±90° phase discriminator 10 which produces in its output a potential the amplitude of which varies with the phase difference between $E_1$ and $E_2$, as shown in curve A of Fig. 4. This output from discriminator 10 is applied to an inverting and doubling amplifier 11, the output of which varies in amplitude and polarity as shown in curve B. The output of the amplifier 11 is passed through a unidirectional clipper 12 which passes only the negative-going portions of curve B. The output of the clipper 12, corresponding to curve C, is applied to a selective inverter 17, to which there is also applied the potential of characteristic F of Fig. 3 from an inverting saturating amplifier 16. This potential F is derived as follows:

Connected to the input terminals 21 and 22 is a 90° phase shifter 13 which alters the phase difference between the input potentials $E_1$ and $E_2$ by 90°. The output of the phase shifter 13 is then applied to a ±90° phase discriminator 14, which may be identical with the phase discriminator 10. The output of the phase discriminator 14 is the potential D of Fig. 5. This potential D is then passed through an inverter 15 which inverts the polarity to produce the potential E of Fig. 5. Potential E is passed through the inverting saturating amplifier 16 which produces the potential F of Fig. 5, which is applied to the selective inverter 17 along with the potential C.

As previously described in connection with Fig. 3, the inverter 17 functions to pass the curve C without inversion when the potential F is positive, and to invert curve C when potential F is negative.

The output potential G from the inverter 17 is passed to a summing circuit 18, together with potential E from the inverter 15. The summing circuit 18 adds potentials G and E to produce potential H, as previously described in connection with Fig. 2. The potential H decreases from a positive value to a negative value in response to a phase change from a negative value to a positive value. If it is desired that the output increase in positive direction in response to a positive phase change, then the potential H is passed through an inverter 19 to produce the potential I of Fig. 2.

Most of the elements of the complete circuit in Fig. 1 are well known and need not be disclosed in detail.

Figure 6:
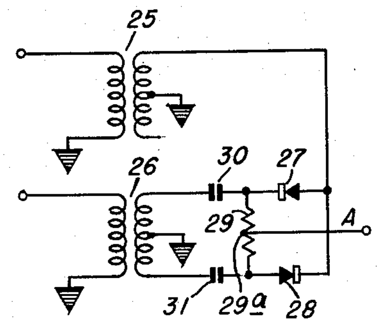
Fig. 6 is a ±90° phase discriminator circuit that may be employed in the system of Fig. 1.

However, the ±90° phase discriminators 10 and 14 may be of the type disclosed in the schematic circuit of Fig. 6, in which the two input potentials are applied to the primary windings of two transformers 25 and 26 respectively. The output of the secondary winding of transformers 25 is applied through two oppositely poled diodes 27 and 28, respectively, to the opposite ends of a voltage divider 29 having a center tap 29*a* connected to the output terminal. Also applied to the opposite ends of the voltage divider 29 through capacitors 30 and 31 are two potentials of opposite phase from the opposite ends of the secondary winding of the transformer 26, the midtap of which is grounded. The output of this circuit is a potential varying in amplitude and polarity according to curve A of Fig. 4 in response to phase variations between the two input potentials.

The inverting and amplitude-doubling amplifier 11 may be a conventional vacuum tube amplifier having an odd number of tubes, so that it is inherently inverting.

The unidirectional clipper 12 may be any one of numerous well-known circuits which pass negative potentials while suppressing positive potentials.

Figure 7:
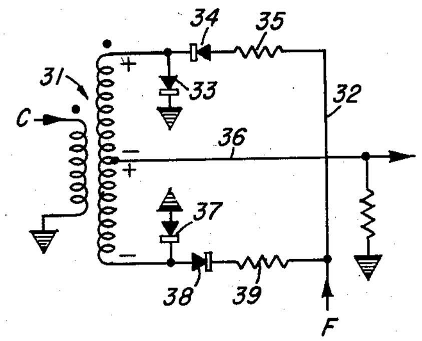
Fig. 7 is a schematic diagram of a bidirectional switch that may be employed in the system of Fig. 1.

The selective inverter 17 may employ the circuit shown in Fig. 7, in which the input potential C is applied to the primary winding of a transformer 31 having a center-tapped secondary winding. The potential F is applied to a conductor 32. The upper end of the secondary winding of the transformer 31 is connected through a diode 33 to ground, and through a diode 34 and a resistor 35 to the conductor 32, and the lower end of the secondary winding is connected through a diode 37 to ground, and through a diode 38 and a resistor 39 to the conductor 32. The diodes 34 and 33 are poled to pass positive portions of the potential F from conductor 32 to ground, and the diodes 38 and 37 are poled to pass negative portions of the potential F from the conductor 32 to ground. The pulses of potential C applied to the primary winding of the transformer 31 are always negative. Hence, the center tap is positive with respect to the lower end, and is negative with respect to the upper end of the secondary winding. The diodes 33 and 37 are of the type having a high resistance in the conducting direction for potentials less than a threshold which is above the value of the potentials developed by the transformer 31. The alternately positive and negative potential applied to the conductor 32 is above this threshold value, so that when the potential F is positive the diodes 34 and 33 are rendered conductive, and the upper end of the transformer secondary is effectively grounded through the diode 33. At this time, the diode 38 is not conductive, and the diode 37 has a high resistance, so that the lower end of the secondary winding is effectively isolated. Under these conditions, a negative potential is applied from the center tap of the transformer to the output potential conductor 37.

On the other hand, when the potential F applied to the conductor 32 is negative, the diodes 34 and 33 are nonconducting, and the upper end of the transformer is effectively isolated. At the same time, current flows through the diodes 38 and 37 to ground, imparting a low resistance to the diode 37 so that the lower end of the secondary winding is effectively grounded. Under these conditions, the positive potential of the center tap relative to the lower end of the secondary winding is applied to the output conductor 37.

Figure 8:
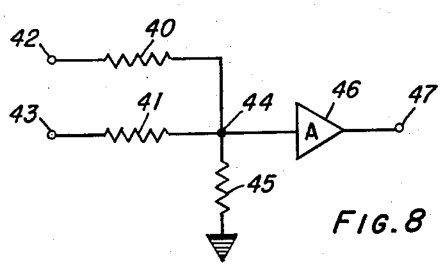
Fig. 8 is a schematic diagram of a summing circuit that may be employed in the system of Fig. 1.

One of various possible summing circuits that may be employed as element 18 of Fig. 1 is disclosed in Fig. 8. It comprises a pair of resistors 40 and 41 connecting two input terminals 42 and 43, respectively, to a common terminal 44 which is connected through a resistor 45 to ground. If the resistors 40 and 41 are equal to each other and very large compared to the resistor 45, the potential at terminal 44 is less than, but approximately proportional to, the sum of two input potentials applied to the input terminals 42 and 43, respectively. The loss can be compensated by an amplifier 46 connected between the terminal 44 and an output terminal 47.

The general system of Fig. 1 is applicable to phase discrimination of either continuous or pulsed input waves. In the case of continuous waves, the output A of the discriminator 10 and the output D of discriminator 14 would be slowly varying or constant voltages, and therefore direct-current circuits would have to be used in the remainder of the circuit. Alternatively, choppers could be inserted in the outputs of the phase discriminators 10 and 14, so that beyond those points all currents would be alternating at the chopper frequency. The specific circuits shown in Figs. 7 and 8 are designed to handle pulsed input potentials, but equivalent circuits are known for handling continuous waves.

When the input potentials $E_1$ and $E_2$ are pulses, all potentials beyond the discriminators 10 and 14 are repeated at the pulse repetition frequency. However, the utility of the system is not limited to a continuous train of pulses, since the system, as shown, is capable of yielding valid information as to the phase angle between single pulses applied to the input terminals 21 and 22.

Numerous possible modifications in the circuit of Fig. 1 will be apparent to those skilled in the art. Thus, curve I may be obtained directly without first obtaining curve H, by substituting a +90° phase shifter for the −90° phase shifter 13. This leaves curves A, B and C unchanged, but inverts curves D, E, F, G and H, so that curve H corresponds to curve I in Fig. 2, and the inverter 19 can be omitted. Another variation is to substitute a subtracting circuit for the summing circuit 18, and apply the potentials D and G thereto, instead of the potentials E and G. The exact circuit employed depends on practical considerations, such as whether an available subtracting circuit has better characteristics than an available summing circuit.

Although for the purpose of explaining the invention a particular embodiment thereof has been shown and described, obvious modifications will occur to a person skilled in the art, and we do not desire to be limited to the exact details shown and described.

We claim:

1. Apparatus responsive to two alternating input potentials of variable relative phase for producing a D.C. output potential varying in the same direction in response to phase variation between said alternating potentials over a range exceeding 180° comprising: first means for deriving from said two input potentials, according to their phase difference, a first D.C. potential varying substantially linearly in one direction in response to phase variations from +90° to −90° and from +90° to +180°, and in reverse direction in response to phase variations from −90° to −180°; second means for deriving from said two input potentials a second D.C. potential of zero value in response to phase variations between −90° and +90° and varying substantially linearly in said one direction from zero to a second value of greater magnitude than said first potential in response to said phase variation from —90° to —180° and varying substantially linearly in said reverse direction from zero to said second magnitude in response to said phase variation from +90° to +180°; and means for combining said first and second potentials to produce said output potential.

2. Apparatus according to claim 1 in which said second means comprises: fourth means for deriving from said two input potentials a third D.C. potential varying from zero in said reverse direction to said second value in response to a phase variation from —90° to —180° and a phase variation from +90° to +180°, and fifth means for inverting said third potential in response to phase variations between —90° and —180° and between +90° and +180° to produce said second potential.

3. Apparatus according to claim 2 in which said fourth means comprises: sixth means for deriving from said two input potentials a fourth D.C. potential varying from said second value at one polarity to the same value of opposite polarity in response to phase variations from 0° to —180° and from 0° to +180°, and seventh means for canceling that portion of said fourth potential of said one polarity to leave said third potential.

4. Apparatus responsive to two alternating input potentials of variable relative phase for producing an output potential varying in polarity and magnitude with the direction and magnitude of the phase angle between said input potentials over a range exceeding ±90° from 0° comprising: first means for deriving from said two input potentials, according to their phase difference, a first D.C. potential increasing from zero to a first value of one polarity in response to phase variations from 0° to 90° in one direction, and increasing from zero to said first value of the other polarity in response to phase variations from 0° to 90° in the other direction, and decreasing from said first values of different polarities back to zero in response to further phase variations beyond 90°; second means for deriving from said two input potentials a second D.C. potential of zero value in response to said phase variations between 0° and ±90°, varying from zero to a second value of said one polarity in response to said further phase variation beyond 90° in said one direction and varying from zero to said second value of said other polarity in response to said further phase variation beyond 90° in said opposite direction, said second value being of greater magnitude than said first value; and means for combining said first and second potentials to produce said output potential.

5. Apparatus according to claim 4 in which said second means comprises: means for deriving from said two input potentials, according to the phase angle therebetween, a third D.C. potential of said one polarity and of zero value during variations in phase angle between —90° and +90° and increasing from zero to said second value of one polarity in response to said further phase variations in each of said opposite directions beyond 90°; and inverting means actuated by said input potentials and selectively responsive to the direction of phase displacement therebetween for inverting the polarity of said third potential only when said variation in phase angle is in one direction.

6. Apparatus according to claim 5 in which said inverting means is responsive to a control potential of a first polarity to pass said third potential without inversion, and responsive to a control potential of a second polarity to pass said third potential with inversion; and means selectively responsive to said input potentials according to the direction of phase difference therebetween for deriving therefrom and applying to said inverting means D.C. control potential of said first polarity in response to phase difference in said one direction and of said second polarity in response to phase difference in said other direction.

7. Apparatus according to claim 6 in which said last-mentioned means comprises a means for deriving from said two input potentials, according to their phase difference, a D.C. potential varying from zero in one polarity and back to zero in response to phase variations from 0° to +180°, and from zero in the other polarity and back to zero in response to phase variations from 0° to —180°; and means for deriving said control potential from said last-mentioned potential.

8. Apparatus responsive to two alternating input potentials of variable relative phase for producing potential indicative of said relative phase comprising: means for deriving from said two input potentials according to their phase difference a first D.C. potential varying substantially linearly in one direction in response to a phase change between —90° and +90° and in the opposite direction in response to phase changes beyond ±90°; means for deriving from said two input potentials according to their phase difference a second D.C. potential varying substantially linearly in response to a phase change between +90° and +180° and a phase change between —90° and —180°; and means for combining the said first and second potentials to produce a third D.C. potential varying substantially linearly in one direction in response to phase changes over a range exceeding ±90°.

References Cited in the file of this patent

UNITED STATES PATENTS

| | | |
|---|---|---|
| 2,349,261 | Ginzton | May 23, 1944 |
| 2,525,448 | Clarke | Oct. 10, 1950 |
| 2,640,939 | Staschaver | June 2, 1953 |
| 2,838,733 | Longfellow | June 10, 1958 |